(12) United States Patent
Wunderlich

(10) Patent No.: US 6,270,100 B1
(45) Date of Patent: Aug. 7, 2001

(54) DEVICE FOR COUPLING BICYCLES IN TANDEM

(76) Inventor: Thomas M. Wunderlich, 205 Harvard St., Cambridge, MA (US) 02139

( * ) Notice: Subject to any disclaimer, the term of this patent is extended or adjusted under 35 U.S.C. 154(b) by 0 days.

(21) Appl. No.: 09/656,816

(22) Filed: Sep. 7, 2000

(51) Int. Cl.[7] ................................................. B62K 27/14
(52) U.S. Cl. .......................... 280/204; 280/292; 280/480; 280/486; 280/491.1
(58) Field of Search .................... 280/204, 239, 280/292, 474, 480, 482, 491.2, 491.5, 486, 485, 491.1, 495; 403/220; 294/131; 135/74

(56) References Cited

U.S. PATENT DOCUMENTS

| | | | | |
|---|---|---|---|---|
| 605,799 | * | 6/1898 | Ripley | 280/204 |
| 693,379 | * | 2/1902 | Davis | 280/204 |
| 1,320,763 | * | 11/1919 | Keane | 280/291.2 |
| 3,271,049 | * | 9/1966 | Schoonmaker et al. | 280/480 |
| 3,610,447 | * | 10/1971 | Ortiz | 280/480 |
| 5,749,592 | * | 5/1998 | Marchetto | 280/292 |
| 6,036,215 | * | 3/2000 | Bruner | 280/292 |

FOREIGN PATENT DOCUMENTS

| | | | | |
|---|---|---|---|---|
| 2323842 | * | 11/1974 | (DE) | 280/480 |
| 14880 | * | 7/1903 | (GB) | 280/292 |

* cited by examiner

Primary Examiner—Anne Marie Boehler
(74) Attorney, Agent, or Firm—Mark P. White

(57) ABSTRACT

A tow bar for attaching two bicycles in tandem arrangement consisting of a hollow rod, tube, or pipe having an attaching strap traversing the length of the interior of the rod or pipe, with the strap being secured to frame members of each bicycle via a friction clamp at each bicycle without the need for tools. Further, the tow bar consists of an assembly of four or more segments that have removeable couplings by which each such segment is attached to an adjacent segment, thereby facilitating ease of assemble and disassembly of the tow bar. Such segments, when disassembled, can be easily stored in a conventional bicycle pouch that can be attached to a frame member of the bicycle.

15 Claims, 9 Drawing Sheets

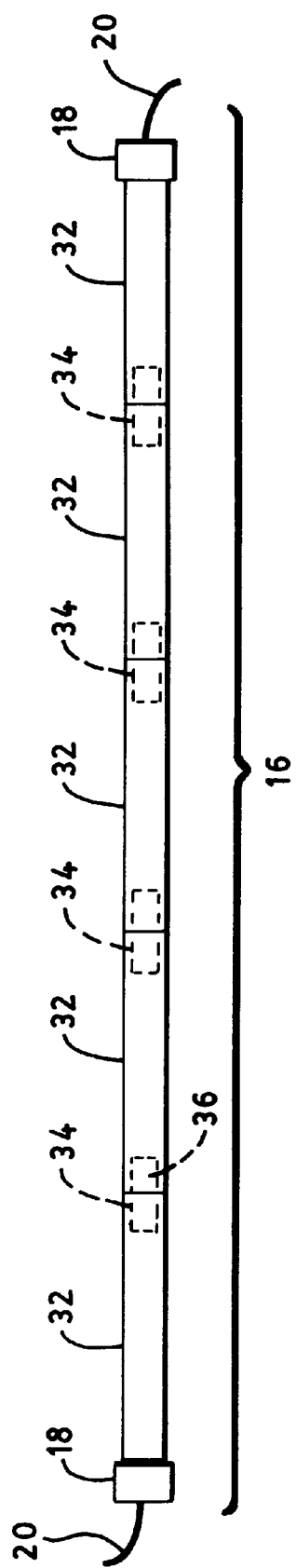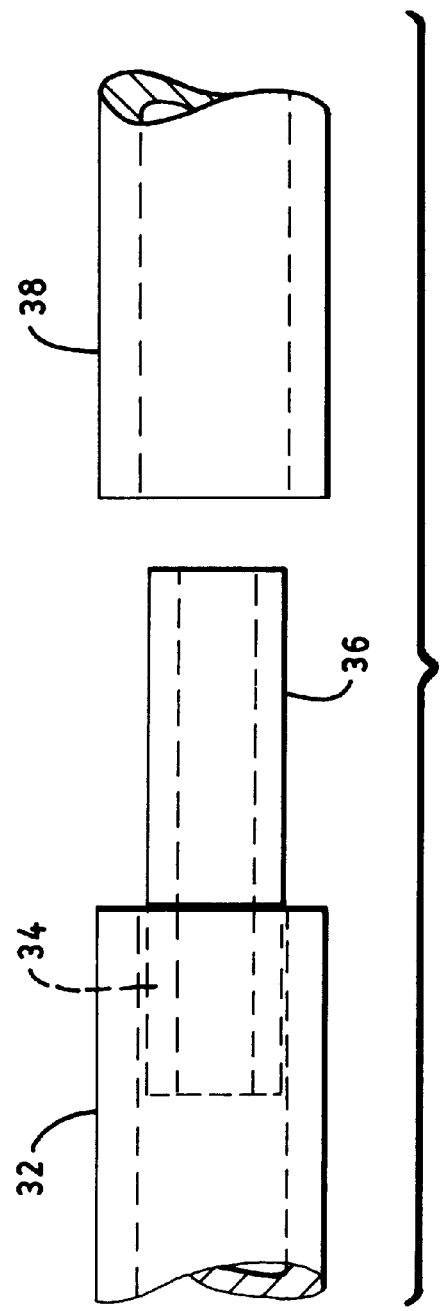
FIG. 2B
FIG. 2A

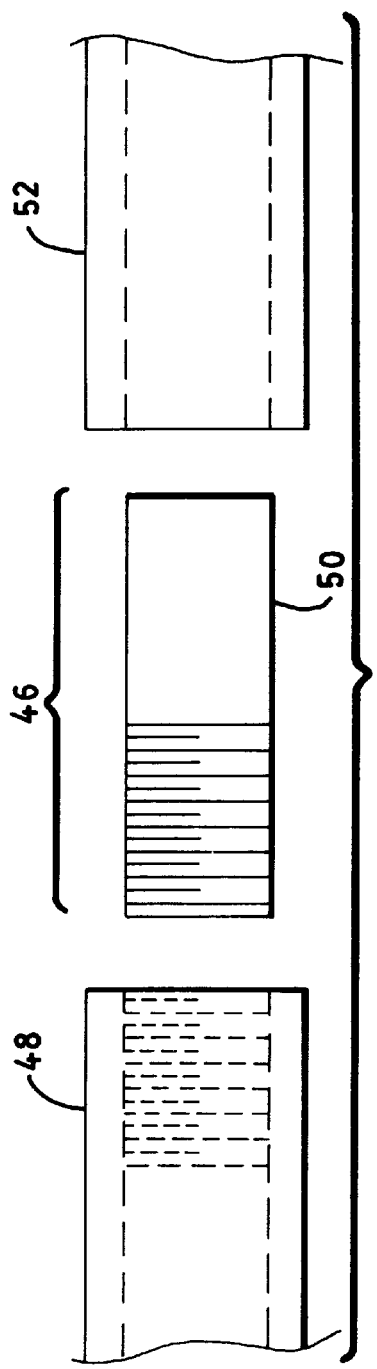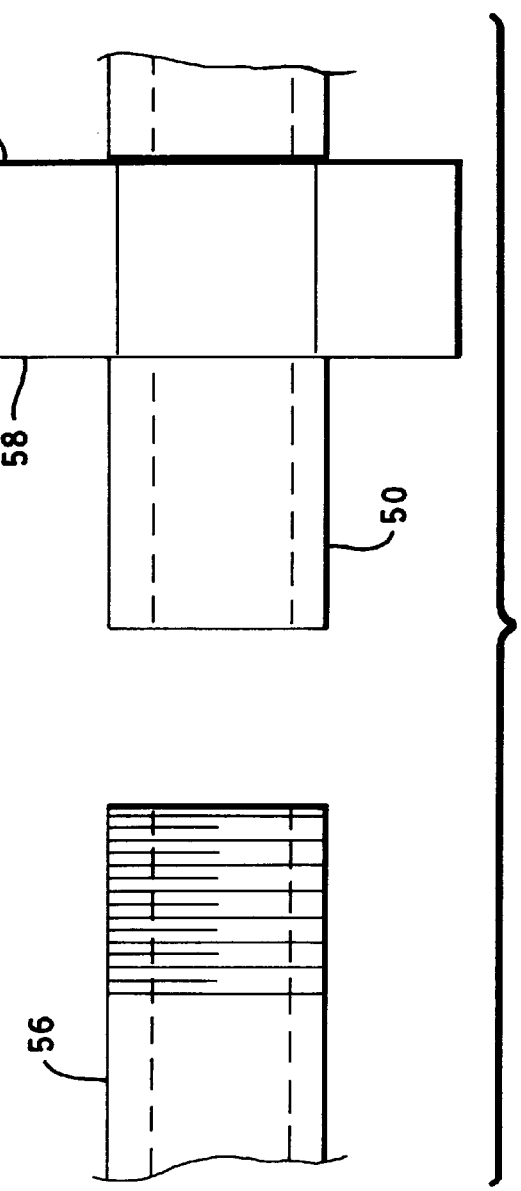

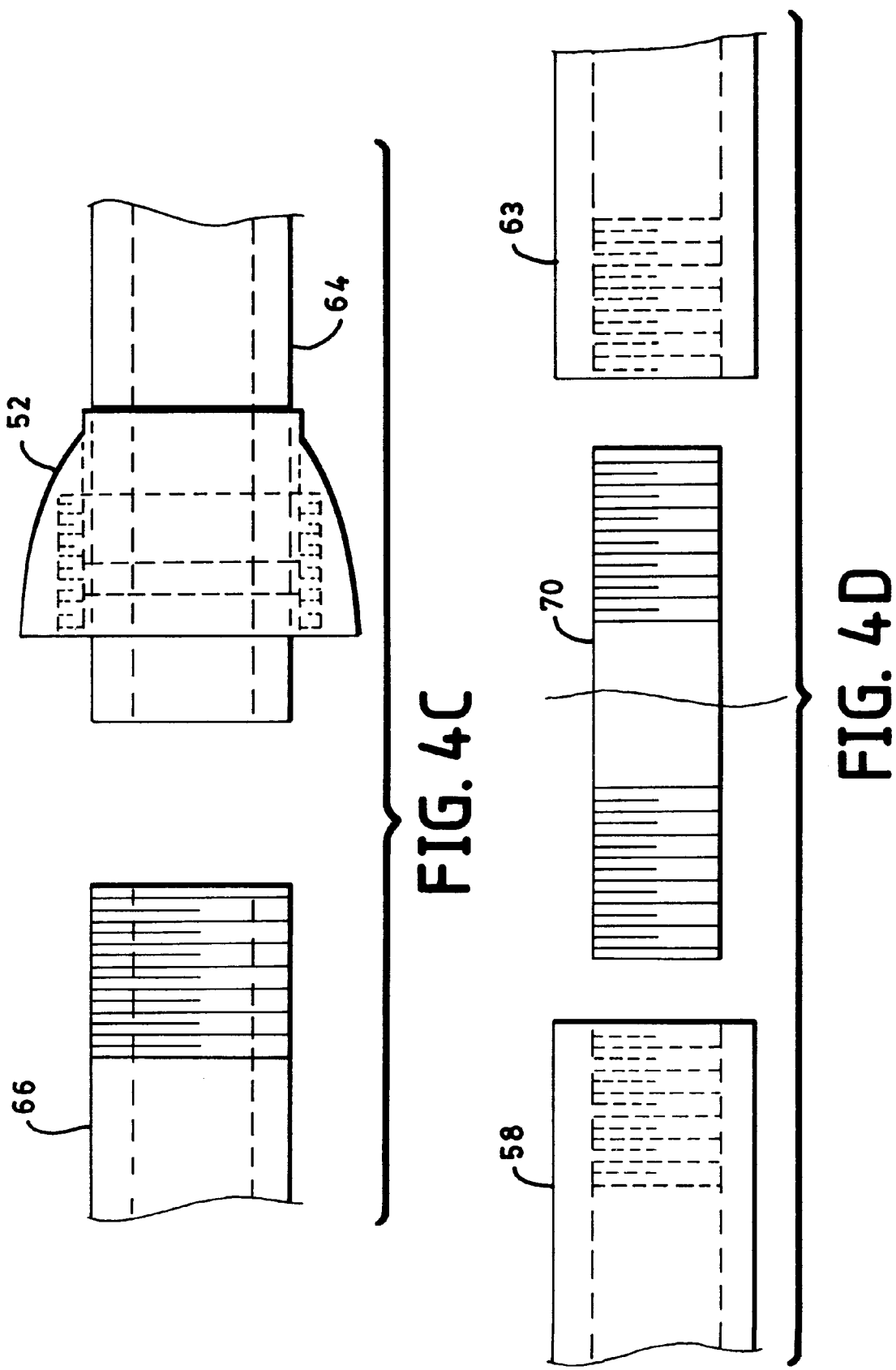

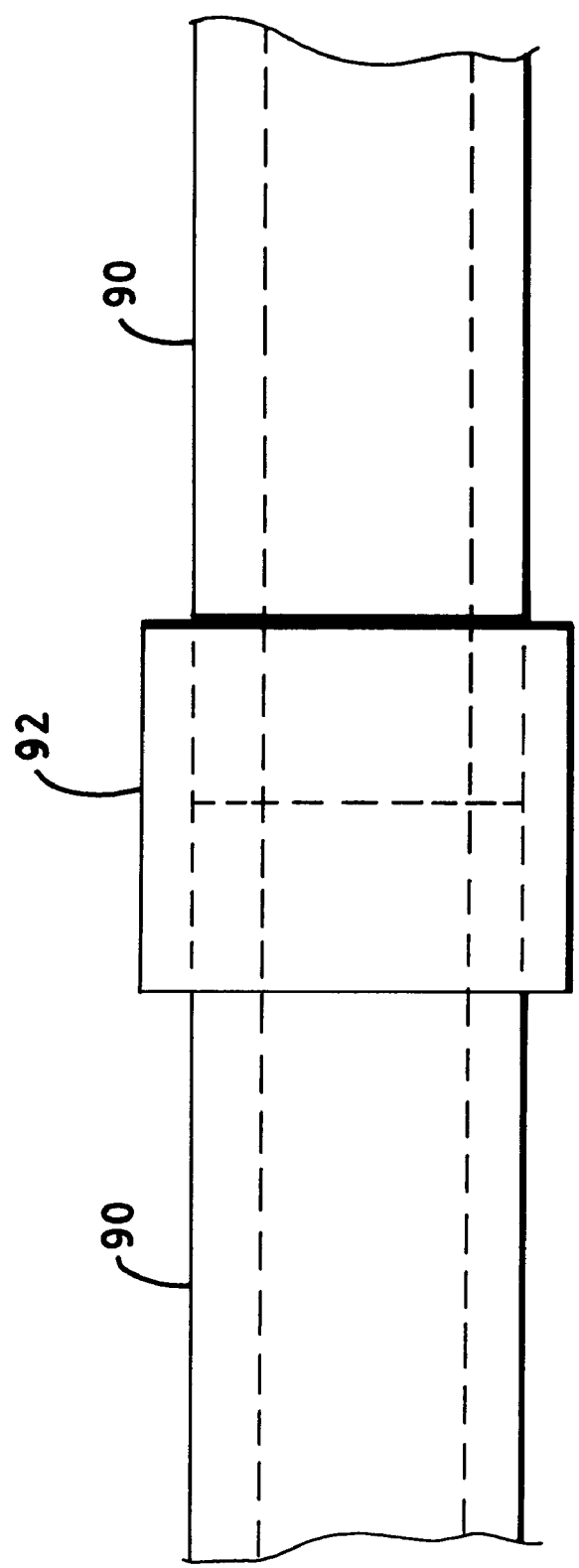

DEVICE FOR COUPLING BICYCLES IN TANDEM

FIELD OF THE INVENTION

This invention relates to the field of bicycles, and more particularly to a device for coupling bicycles in tandem.

BACKGROUND OF THE INVENTION

In a conventional tandem bicycle (tandem), two or more riders are positioned on a single rigid, two-wheeled frame, with each rider typically having a pedal gear, each of which are linked via a single chain to a rear wheel drive gear. Since the pedal linkage is fixed, all pedal gears are in constant motion with no ability for any individual rider to rest. This has prevented widespread use of such tandems, and the associated lower production volumes have lead to relatively higher prices when compared with single bicycles.

Several attempts have been made to overcome this price and availability by linking two or more bicycles to provide the same characteristics as the tandem, but at a much lower cost. Such links usually involve attaching a rigid rod or frame between the seat mount member of the forward bicycle and the front frame members or yoke of the trailing bicycle to prevent the steering wheel of the rear bicycle from having independent movement. The joined combination then allows either rider to cease pedaling and allow for rest periods while the other rider provides the locomotion power. Such links typically are removable to allow the use of either the tandem arrangement or the use of each bicycle separately.

However, the added length associated with the two extra wheels in such a rigid arrangement leads to poorer maneuverability and control over that of conventional tandems. To overcome this lack of maneuverability, the tow bar is typically either flexibly attached or has a form of pivoting or universal joint that allows the two separate bicycles a degree of independent motion or "bending of the combination", especially on turns. U.S. Pat. No. 4,261,592 to Busseuil discloses a dual universal joint system to provide such flexibility.

A significant disadvantage of Busseuil is that the dual universal joints are mounted one to each bicycle via special adapters in the form of collars or welded attachments that require specialty tools that are not normally associated with simple bicycle tool kits. Additionally, the single tow bar of Busseuil cannot be easily carried if it was detached to separate the individual bicycles at a location away from the normal storage place.

Accordingly, the present invention provides an improvement over the conventional implementations of connecting two bicycles in tandem by semiflexibly linking the two bicycles using a rod or pipe having an internal strap with securing clips. Using such a pipe structure assembled from a multitude of short pipe sections joined and secured without the need for specialty tools, the present invention provide the added advantage of quick and simple assembly and disassembly of the rigid rod into more easily transportable sub-elements.

SUMMARY OF THE INVENTION

A tandem bicycle can be created using a linking device between two conventional bicycles according to a preferred embodiment of the present invention. By securely attaching a hollow semi-rigid rod between the two bicycles to an appropriate frame member of each bicycle via a strap that traverses the interior of the rod and a pair of clamps, the combination structure performs as a single tandem bicycle.

It is a primary object of the present invention to provide a means for attaching such a linking rod without the use of tools.

It is a second object of the invention to provide a means of rapid and easy disassembling of the linking rod into sectional elements for easy transport and storage when not in use.

It is a third object of the present invention to provide a means for the easy assembly of the hollow linking rod through the use of alignment and mating elements integrated into said sectional elements. Through the use of interior dowels or exterior collars that permanently attach via adhesive or threads to one of the structural elements and extend beyond the end of that structural element, sliding alignment can be easily made with an adjacent structural element. When secured in place, the compressive arrangement keeps the linking rod rigid.

It is a fourth object of the present invention to implement the linking rod and attachment mechanism using commonly available materials and products.

It is a fifth object of the present invention to construct said linking bar using common PVC piping, thin-walled aluminum piping or rectangular channels.

BRIEF DESCRIPTION OF THE DRAWINGS

FIG. 2a shows an exploded view of a smaller diameter internal coupling affixed to the inside of a sectional segment.

FIG. 2b shows a tow bar made up of four segments of thin wall tube, each connected with adjacent segments by means of internal couplings.

FIG. 4a depicts the use of one-sided threaded couplings to connect the segments of the tow bar.

FIG. 4b depicts the use of a threaded collar to connect the segments of the tow bar.

FIG. 4c depicts the use of threaded compression fitting to connect the segments of the tow bar.

FIG. 4d depicts the use of two-sided threaded couplings to connect the segments of the tow bar.

FIG. 4e depicts the use of a standard PVC plumbing coupling to connect the segments, made of PVC plumbing pipe, of the tow bar.

DETAILED DESCRIPTION OF THE INVENTION

Tandem bicycles feature a two-wheeled vehicle, where separate seats and pedals are provided for more than one rider. Two individual bicycles can be connected to provide the same tandem arrangement using a semi-rigid tow bar according to the present invention. The tow bar has sufficient flexibility to allow for easy maneuvering of the combined two-bicycle structure and can be disassembled into component pieces for storage and transporting, such that at any time the tandem arrangement can be implemented as desired using no tools.

Figure 1A:
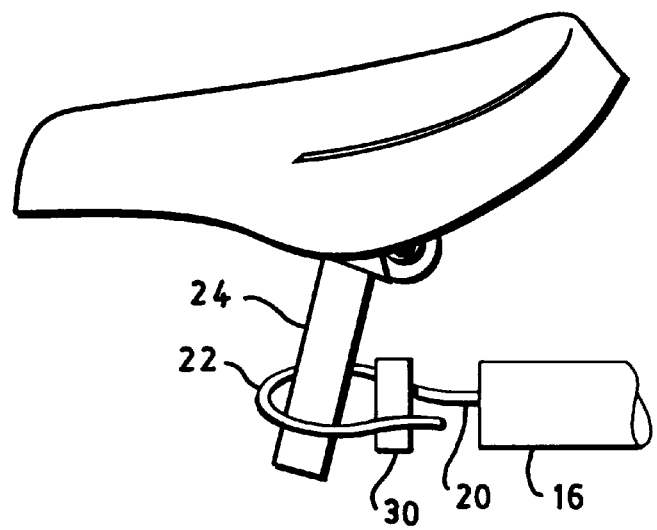
FIG. 1a depicts one end of the tow bar attached about the seat post of the forward bicycle in accordance with the present invention.
Figure 1B:
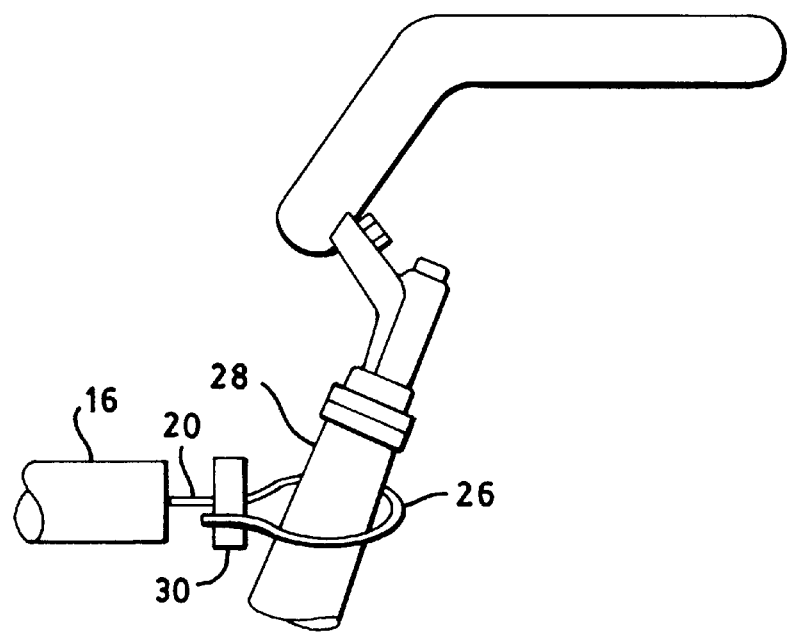
FIG. 1b depicts the other end of the tow bar attached about the front frame member post of the rear bicycle in accordance with the present invention.
Figure 1C:
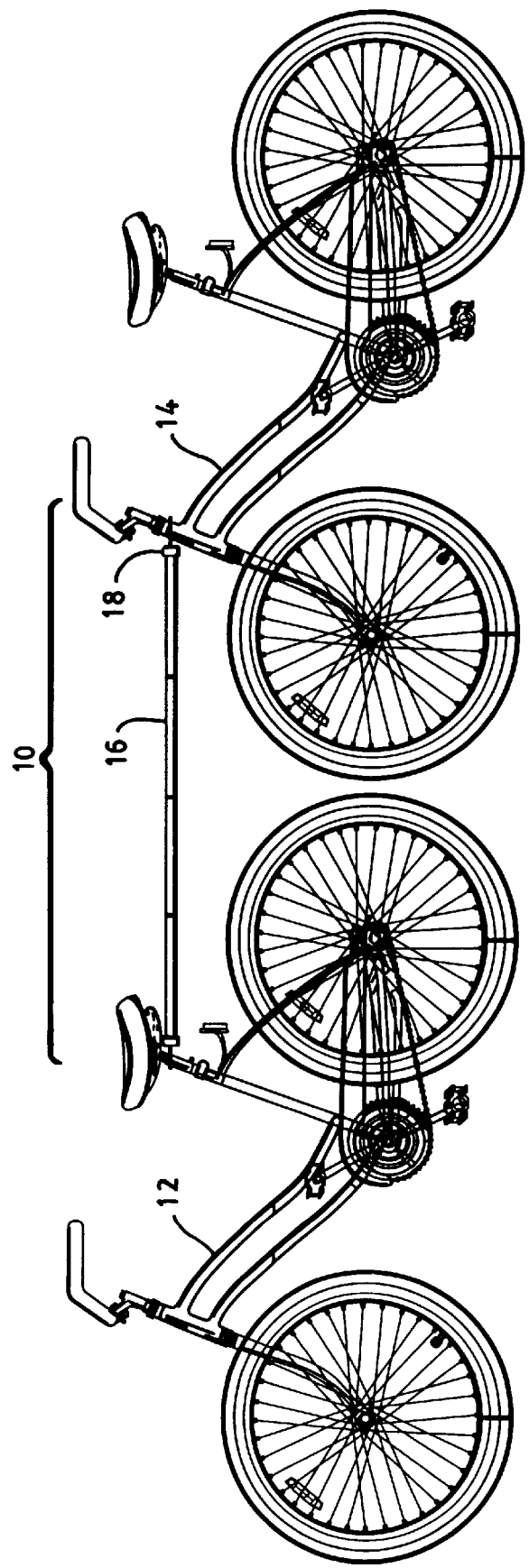
FIG. 1c depicts shows a tow bar attaching two bicycles in tandem according to a preferred embodiment of the present invention.

FIG. 1c shows a tow bar 10 attaching two bicycles 12 and 14 in tandem according to a preferred embodiment of the present invention. Tow bar 10 consists of a hollow rod or pipe 16 made from a semi-rigid material, such as standard PVC plumbing pipe or thin-walled aluminum pipe. An exemplary length of tow bar 16 would be six feet. Although the length of the tow bar need only be sufficient to allow the front wheel of the rear bicycle to clear the rear wheel of the front bicycle, test have shown that lengths of up to 8 feet provide superior handling capabilities.

Tow bar 10 is separated at each end from contact with bicycles 12 and 14 by a resilient spacer 18 to prevent marring or damage to either bicycle. In addition, the spacer provides a more secure connection with the seat or front frame member post of the bicycles, by expanding or contracting to allow more variation in the tension of the connecting strap, as will be described infra. Spacer 18 is preferably composed of a rubber or compliant plastic material.

Referring to the expanded views of FIGS. 1a and 1b, a web strap 20 is contained within the length of pipe 16 with excess strapping extending beyond each end of the pipe. The assembly is secured by forming a first loop 22 around the seat frame member 24 of the forward bicycle 12 and a second loop 26 at the other end of linking pipe 16 around the post supporting the front frame members or front yoke 28 of trailing bicycle 14. Note that although spacers 18 are present in the assembly, they are not shown in FIGS. 1a and 1b in order to provide clarity to the assembly details.

Both loops are then cinched and clamped using a quick-release clamp 30, such as an alligator clip. In the preferred embodiment, friction clamping holds the attached pipe 16 to the mounting frame members 24 and 28 without slippage, and the two-bicycle assembly then becomes a semi-rigid structure that performs as a conventional tandem bicycle. The combined structure has sufficient flexibility on turns due to the ability of the webbing loops to rotate about the seat post and front frame member post, thereby providing a "universal" connection similar that described by Busseuil. The ability of the connection to rotate allows the two bicycles to be out of alignment, and still function as a tandem unit.

The strap in the preferred embodiment is a web formed by weaving synthetic, non-absorbent fibers. Alternatively, other types of lines may be used, including synthetic or natural ropes, both woven and non woven, braided or non braided, and also including chains of medal, plastic, or other materials.

To facilitate portability and storage of the tow bar 10 when not in use, tow bar 16 is made of thin-wall aluminum rigid tubing, preferably sectioned into four or more segments 32 as shown in FIG. 2b. FIGS. 2a and 2b additionally show an assembled tow bar 16 having an exemplary hollow internal coupling 34 located at each joint connection of sectional segments 32, each internal coupling 34 having an alignment projection 36 for quickly and easily connecting the tubing section piece with adjacent section segments.

Such an internal coupling 34 preferably consists of a short length of tubing having an outer diameter dimension that fits within the inner diameter dimension of the linking segment and is secured via press fitting, or may be secured at one end only via a bonding agent.

In the case that a thick-wall pipe, the bonding of the internal couplings may be replaced by the use of threaded couplings on one or more sides.

In the exploded view of FIG. 2a, the smaller diameter internal coupling 34 is cemented to the inside of sectional segment 32 with projecting end 36 extending beyond the end of sectional segment 32. When Sectional segment 32 is mated in sliding arrangement to sectional segment 38, the projecting coupling end 36 fits within the inner diameter of sectional segment 38.

Figure 3B:
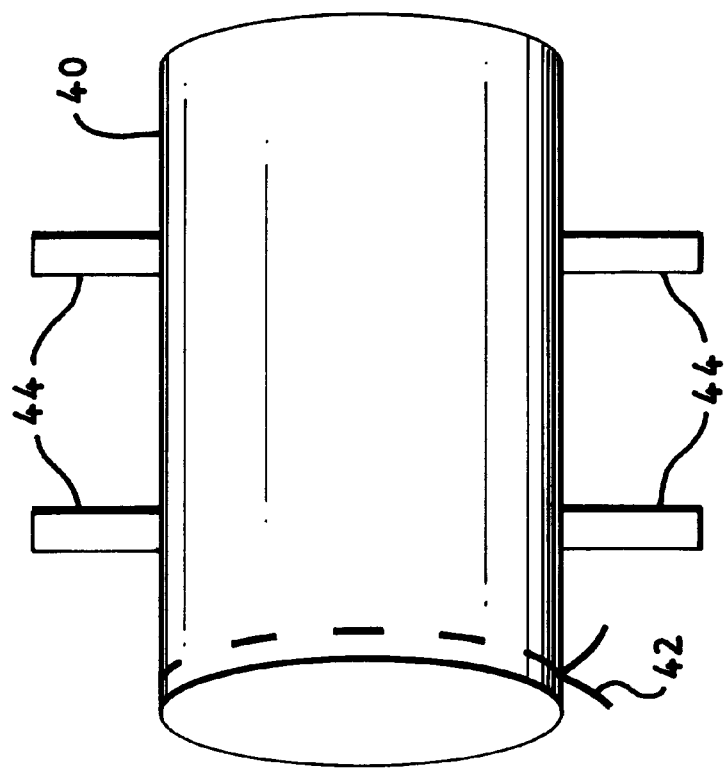
FIG. 3b depicts a carrying pouch used on bicycles, in which the dissembled tow bar may be stored.
Figure 3A:
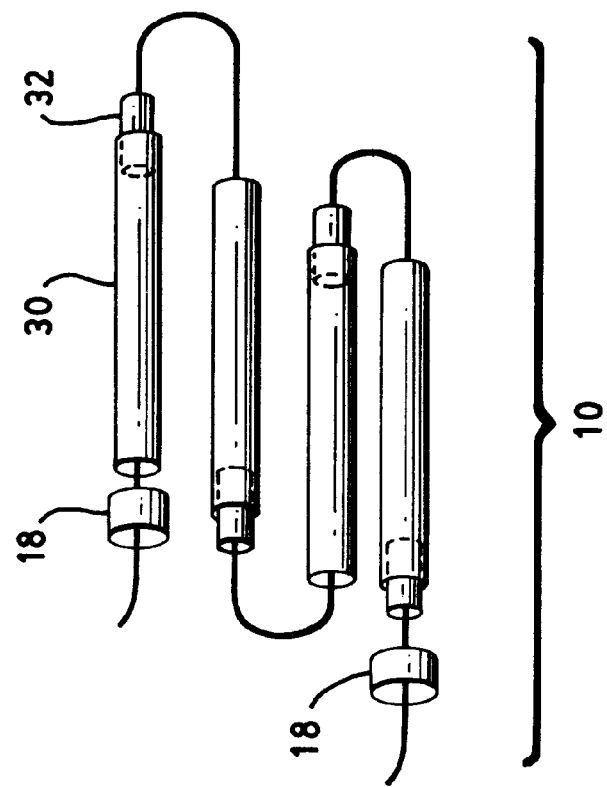
FIG. 3a shows the exemplary tow bar of FIG. 1 disassembled into its sectional segments.

FIG. 3a shows an exemplary disassembled tow bar 10 of FIG. 1 into the multitude of sectional segments 32 ready for storage in a conventional carrying pouch 40 used on bicycles. In the example, pipe 16 is sectioned into quarters. For the six foot linking pipe 16, each of these sections 32 would be 1.5 feet in length, a dimension that easily and conveniently fits a conventional bicycle carry pouch 40. Referring now to FIG. 3b, pouch 40 can be secured by a variety of closure devices, such as a buckle or draw-string 42 and attached to the bicycle via Velcro® straps 44 to a horizontal frame member or attached across the back of the bicycle seat.

FIGS. 4a through 4e show alternate coupling techniques according to the present invention. Referring first to FIG. 4a, a smaller diameter coupling 46 is threaded for screwing into threaded sectional piece 48. Projecting end 50 is then mated in a press-fit arrangement to sectional piece 52.

A coupling structure can also be larger than the piping material, such as a collar that fits over the outer diameter of the linking pipe, and is secured via a bonding agent or via threads. As depicted in FIG. 4b, a larger diameter collar 54 is threaded to screw onto sectional piece 56, and the inner diameter of projecting collar end 58 mates in sliding arrangement with the outer diameter of sectional piece 60. Again, only one end needs to be permanently secured. When using threads as the securing means, one or both ends of the collar or coupling can be threaded.

A fourth embodiment features a compression type fitting as is commonly used in plumbing. FIG. 4c shows a conventional plumbing compression-type fitting 62 for securing the two sectional pieces together. The compressive element 62 is permanently secured to one end of pipe section 64 and has a mating aperture of appropriate size to accept the diameter of the adjacent pipe section 66. When compressive fitting 62 is tightened, the sections 64 and 66 are rigidly connected together.

A fifth embodiment, as shown in FIG. 4d, features two different diameter pipes for alternating sections having an inner thread on the larger pipe section 68 and outer threading on the smaller pipe section 70. The sections 68 and 70 are then screwed or twisted to connect them together. To insure the desired rigidity, however, smaller pipe 70 must be at least of a sufficient diameter to withstand the stress of the tandem application, and larger outer pipe 68 must be oversized by having a inner diameter equal to that of the outer diameter of smaller pipe 70. A variation on such an embodiment would be a hollow pipe that is flared or crimped at one end to a diameter that mates with an unaltered end of the adjacent pipe, similar to that of a television antenna mast.

In a final embodiment, as shown in FIG. 4e, PVC plumbing pipe is used to form the segments of the tow bar, and the external couplings 80 supplied by the PVC manufacturer for use with this pipe are also used to connect the segments. Although when used in plumbing applications the couplings are cemented to each end of the pipe segments 82, in the current application the cement is omitted, a the coupling makes a snug press fit connection without any cement.

In each of the above embodiments, buffers in the form of washers, or caps, attached to the ends of segments which connect with the bicycle posts are used to provide a degree of shock absorbtion, so that shocks are not transmitted from one bicycle to the other by way of the tow bar. In addition, these buffers allow the connection straps to be attached with a greater degree of variation in tension, while still providing a reliable attachement.

Figure 5:
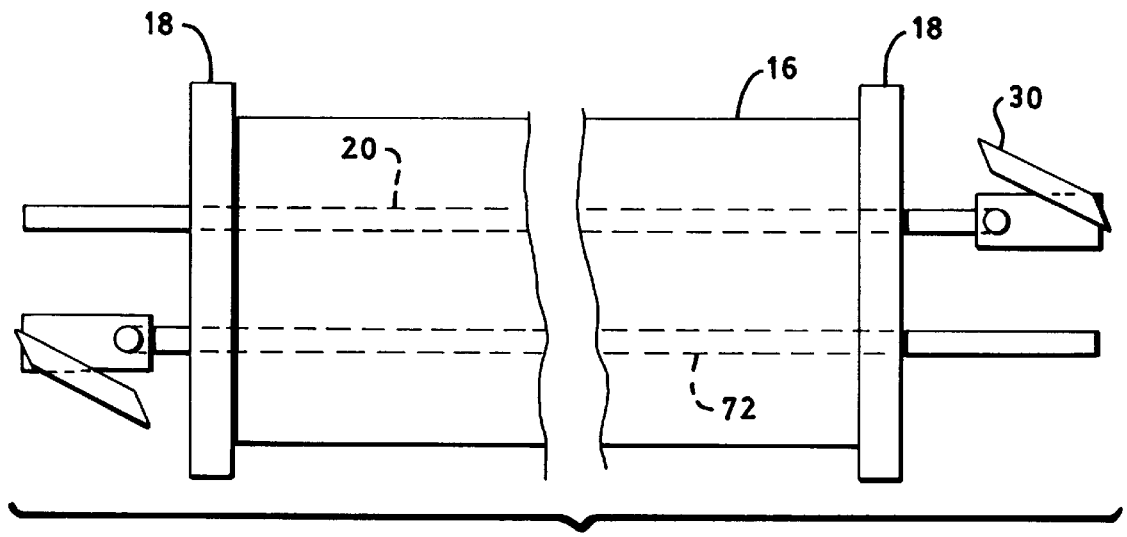
FIG. 5 shows an alternate embodiment using two straps for securing the linking structure to the two bicycles.

Referring now to FIG. 5, an alternate embodiment uses a second web strap 72 traversing the interior of pipe 16 in addition to the single web strap 20 described in the previous embodiments. This alternate embodiment provides that each web has a clamp end , to which a clamp 30 is attached, and a bitter end 74, on the opposite end to that of the first web strap as shown in FIG. 5. In this embodiment the dimensions of the clamp are such that it cannot fit, or be pulled, through the inside of the pipe 16.

Figure 6:
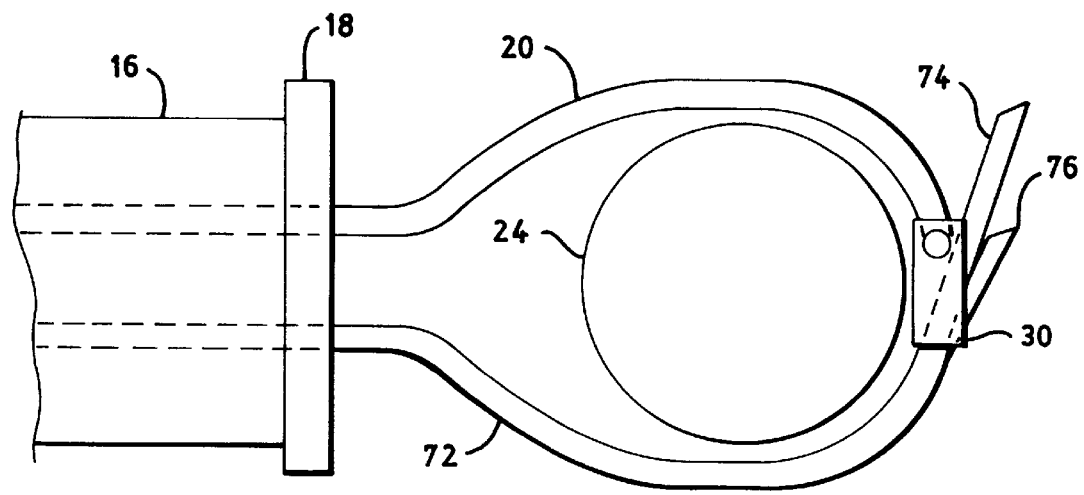
FIG. 6 shows a top plan view of a typical clamp arrangement using two straps according to the present invention.

In this embodiment the two straps are mirror images of each other, and attach to their respective posts, that is, the front frame member post and the seat post, in the same way, as shown in FIG. 6.

Referring now to FIG. 6, the bitter end 74 of one of the straps is looped around the associated post 24 and then tightened and secured by means of clamp 30 on the outermost side of the post away from the tow bar. As shown in FIG. 6, the post 24 is not yet in contact with the rubber buffer, or shock absorber 18, but in practice the strap will be drawn tight, pulling the post 24 against shock absorber 18.

An identical arrangement applies for attaching the other end of tow bar 30 to front frame member post 28 of the trailing bicycle shown in FIG. 1b, but with clamp 30 on strap 72 receiving the bitter end of strap 20 and being tightened and clamped. It is readily apparent that a single double-length strap returned after looping a frame member can secure the assembly using only a single clamp, but such an arrangement is not considered practical, as it requires fishing the web through all the segments whenever reassembling the tow bar.

To release clamp 30, one simply presses a release mechanism 76 to release the pressure on straps 20 and 72. With such a clamp 30, assembly and disassembly of the apparatus can easily be accomplished without tools. There are a wide variety of clamps that provide such positive clamping which can be used. Such clamps are any of the variety of clamps currently in use with cargo-securing straps, such as locking-bar clamps, ratchet clamps, and fold-back clamps.

Figure 7:
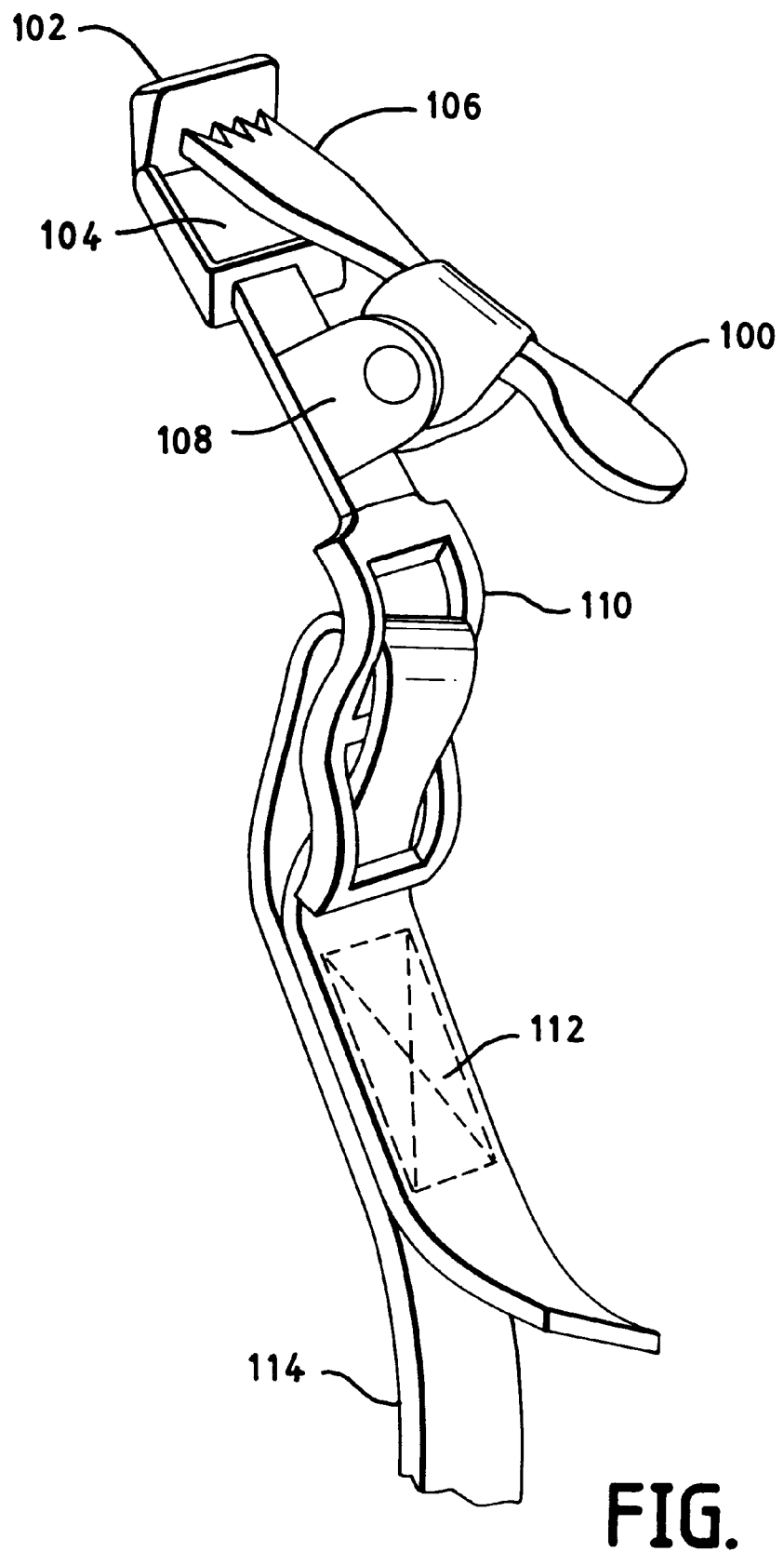
FIG. 7. shows a perspective view of the clamp unit used to secure the tow bar about a bicycle post, with the clamp end of the web affixed.

A exemplary clamp unit, used in the preferred embodiments of this invention, is shown in FIG. 7. Referring to this figure, the clamp is attached to the clamp end 114 of the web strap, by running this end of the strap around the buckle 110, and sewing the doubled end at the connection point 112. Affixed to the buckle 110 is the clamp itself, which includes a handle 100 end and a crimp end 106, which contains teeth as shown. The bitter end of the adjacent web (not shown) is led through the opening 104, and is crimped between the crimp end and the crimp plate 102. The handle rotates with respect to the buckle by means of hinge 108.

From the above, it can be readily seen that creating a tandem bicycle from two separate bicycles using a tow bar composed of smaller connectable sectional pipes or tubes offers a significant improvement in transportability and storage over the conventional implementations. Further, use of an attaching strap contained within the interior of the linking pipe provides the ability to assemble the tandem bicycle arrangement without tools or having attachments welded onto the bike frame to accommodate a joined linking rod.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A tow bar for attaching two bicycles as a tandem comprising:
   (a) two hollow, elongated end members, each further comprising an attachment end and a coupling end which further comprises a decoupleable coupling;
   (b) one or more hollow, elongated central members, all located between the end members, and each having two ends each of which further comprises a decoupleable coupling;
   (c) a first line and a second line, both running through the hollow portion of each end member and each central member, each line having a clamp end and a bitter end;
   (d) a clamp affixed to the clamp end of each line;
   (e) a compliant shock absorber affixed to the attachment end of each end member,
   so that, when the tow bar is in use, the clamp end of the first line encircles a structural member of one bicycle and clamps to the bitter end of the second line, and the clamp end of the second line encircles a structural member of the other bicycle and clamps to the bitter end of the first line.

2. The tow bar of claim 1, wherein the flexible lines are a member of the group which consists of straps, webs, ropes, and chains.

3. The tow bar of claim 2, wherein each end member and each central member comprises a thin walled aluminum pipe, and wherein each decoupleable coupling further comprises an internal press-fit coupling.

4. The tow bar of claim 2, wherein each end member and each central member comprises a thick-walled pipe, and wherein each decoupleable coupling further comprises a multiplicity of screw threads.

5. The tow bar of claim 2, wherein each end member and each central member comprises a PVC pipe, and wherein each decoupleable coupling further comprises a PVC coupling.

6. A method for attaching two bicycles as a tandem comprising:
   (a) locating two hollow, elongated end members between the bicycles, each end member further comprising an attachment end and a coupling end, which further comprises a decoupleable coupling;
   (b) locating one or more hollow, elongated central members between the end members, each central member having two ends, and each central member further comprising a decoupleable coupling at each end;
   (c) running a first line and a second line through the hollow portion of each end member and each central member, each line having a clamp end and a bitter end;

(d) affixing a clamp to the clamp end of each line;

(e) affixing a compliant shock absorber to the attachment end of each end member, so that, when the method is in use, each elongated member is coupled to an adjacent elongated member, the clamp end of the first line encircles a structural member of one bicycle and clamps to the bitter end of the second line, and the clamp end of the second line encircles a structural member of the other bicycle and clamps to the bitter end of the first line.

7. The method of claim 6, wherein the flexible lines are a member of the group which consists of straps, webs, ropes, and chains.

8. The method of claim 7, wherein each end member and each central member comprises a thin walled aluminum pipe, and wherein each decoupleable coupling further comprises an internal press-fit coupling.

9. The method of claim 7, wherein each end member and each central member comprises a thick-walled pipe, and wherein each decoupleable coupling further comprises a multiplicity of screw threads.

10. The method of claim 7, wherein each end member and each central member comprises a PVC pipe, and wherein each decoupleable coupling further comprises a PVC coupling.

11. A tow bar for attaching two bicycles as a tandem comprising:

(a) two hollow, elongated end members;

(b) one or more hollow, elongated central members, all of which are positioned between the end members;

(c) a first line and a second line, both running through the hollow portion of each end member and each central member, each line having a clamp end and a bitter end;

(d) a clamp affixed to the clamp end of each line;

(e) a compliant shock absorber affixed to the attachment end of each end member, so that, when the tow bar is in use, the clamp end of the first line encircles a structural member of one bicycle and clamps to the bitter end of the second line, and the clamp end of the second line encircles a structural member of the other bicycle and clamps to the bitter end of the first line.

12. The tow bar of claim 11, wherein the flexible lines are a member of the group which consists of straps, webs, ropes, and chains.

13. The tow bar of claim 12, wherein each end member and each central member comprises a thin walled aluminum pipe.

14. The tow bar of claim 12, wherein each end member and each central member comprises a thick-walled pipe.

15. The tow bar of claim 12, wherein each end member and each central member comprises a PVC pipe.

* * * * *